Feb. 5, 1952     G. L. FREDENDALL     2,584,441
VIEWING SCREEN
Filed May 3, 1946
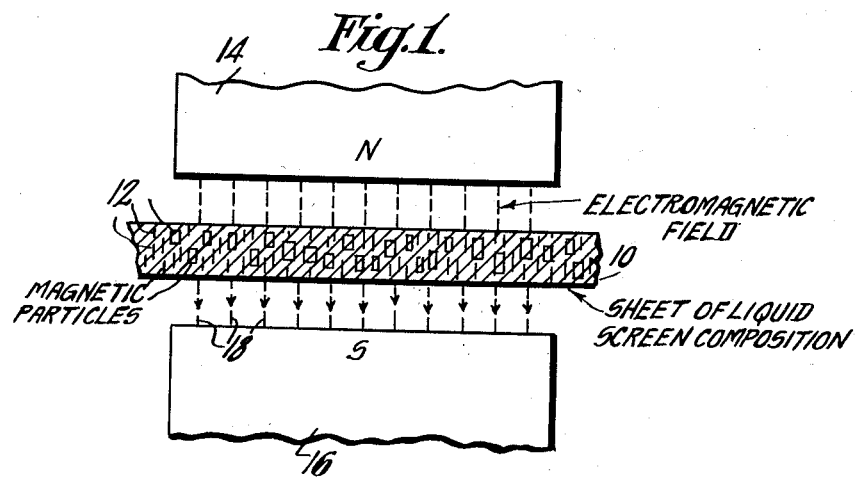
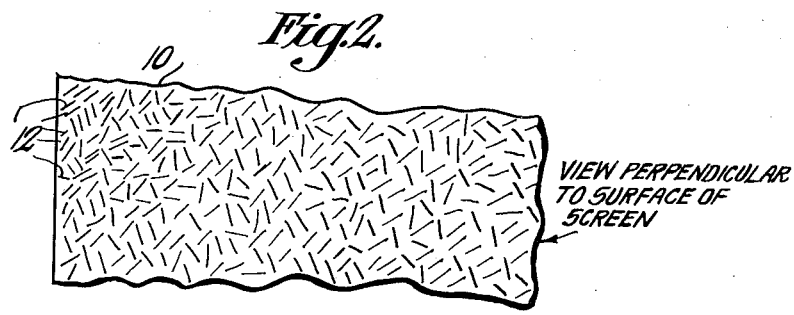
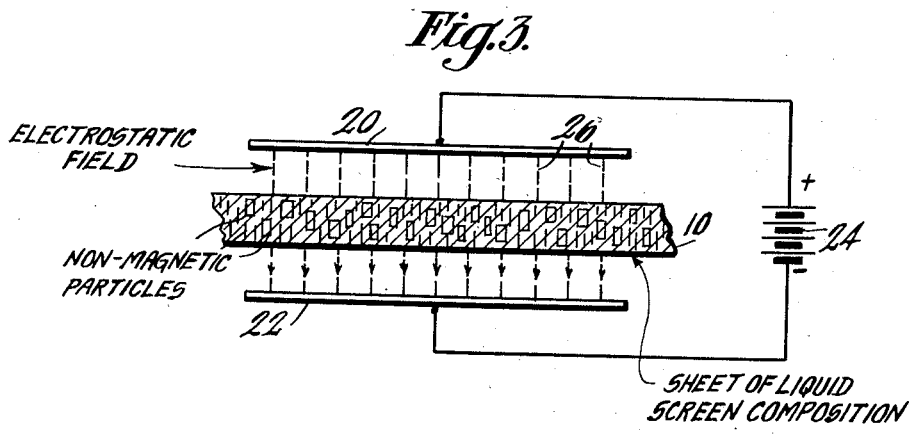
INVENTOR
Gordon L. Fredendall
BY
ATTORNEY Patented Feb. 5, 1952

2,584,441

UNITED STATES PATENT OFFICE 2,584,441

VIEWING SCREEN

Gordon L. Fredendall, Feasterville, Pa., assignor to Radio Corporation of America, a corporation of Delaware Application May 3, 1946, Serial No. 666,905

1 Claim. (Cl. 88—28.93)

The present invention relates to a screen upon which optical images may be viewed.

In certain optical systems, the elements thereof are arranged so that an image is projected onto one surface of a translucent screen. Due to the light-diffusing properties of the screen material, the image appears on the opposite surface of the screen, where it may be viewed by an observer.

While screens of the above character find employment in numerous fields, they are particularly suited for use in television receivers of the so-called projection type. These television receivers customarily include a cathode ray tube on the luminescent face of which an electro-optical image is reproduced. By means of an optical system, which, in one widely used form of image enlarger, comprises a spherical mirror, a correcting plate, and a reflecting surface, the image appearing on the face of the cathode ray tube is projected onto one surface of a translucent screen which lies in the focal plane of the optical system. This screen, in some instances, is formed integral with the cabinet housing the television apparatus, and in other arrangements is designed to be movable relative thereto. In each case, however, the image is projected upon that surface of the screen which faces the interior of the cabinet or housing, and then is diffused through the screen to appear on the front surface thereof where it may be viewed by an observer at a distance from the cabinet.

In practice, the degree of contrast in an image reproduced in the above manner depends in part on the light-diffusing properties of the screen material. This will be apparent when it is considered that the light impinging the rear surface of the viewing screen is diffused not only in the direction of incidence, or, in other words, substantially perpendicular to the surface of the screen, but also in all other directions including that parallel to the screen surface. As a result, areas of the screen which are intended to represent relatively dark parts of an image are caused to appear lighter, due to the diffusion thereinto of light from the relatively brighter image portions. This is especially true near the boundaries between such portions. Consequently, the actual tone values of the image may not be faithfully reproduced on the viewing screen.

The above condition is not normally susceptible to correction by reducing the light-transmitting properties of the screen material itself, since this reduces the percentage of the impinging light which is passed through the thickness of the screen to illuminate the viewing surface thereof. Any lowering of the overall screen brilliance in projection-type television receivers cannot customarily be tolerated.

In carrying out the present invention, the light-diffusing properties of the material composing the viewing screen need not be lowered, but may even be increased in a manner now precluded by the above-mentioned deleterious effects of such an increase on the contrast of the reproduced image. According to the present disclosure, a viewing screen is provided which substantially prevents light which impinges one surface of the screen from being diffused within the screen material in all directions except that normal to the surface of the screen. This is accomplished by dispersing in the liquid screen composition a relatively large number of thin, flat particles of opaque material. The liquid screen composition is then caused to form a sheet of any practical thickness, dependent upon the type of viewing screen desired. Now, while the screen composition is still in a liquid, or semi-liquid state, the opaque particles are oriented by an external means so that the flat surfaces of the particles respectively lie in planes which are substantially perpendicular to the surface of the sheet. The angles formed by the planes of adjacent particles with each other may vary at random between zero and 180°, however, since the external orienting means is not intended to have any effect on this particular relationship of the particles. Since there are a relatively large number of particles per unit area of screen surface, light which impinges one surface of the screen, and which would normally be diffused in a direction away from the direction of incidence, will be intercepted by the flat surfaces of the opaque particles and hence prevented from entering screen areas which may represent darker parts of the image.

One object of the present invention, therefore, is to provide an improved form of screen for viewing optical images.

A further object is to provide a translucent viewing screen wherein light which impinges one surface thereof is prevented from being transmitted through the screen material to any appreciable degree in all directions except that near the normal to the screen surface.

Other objects and advantages will be apparent from the following description of a preferred form of the invention and from the drawings, in which:

Fig. 1 illustrates in cross-section a portion of a viewing screen in accordance with the present invention, also showing one method of aligning the opaque particles when the latter are composed of magnetic material;

Fig. 2 is a top or plan view of a portion of a viewing screen as shown in Fig. 1; and Fig. 3 is a modification of Fig. 1 illustrating one method of aligning the opaque particles when the latter are composed of non-magnetic material.

In carrying out one form of the present invention, the material of which the viewing screen is to be composed is utilized in a liquid, or semi-liquid state. If the material is not provided in such a liquid, or semi-liquid state, it is reduced thereto by any desired means. This screen composition may be of any suitable nature which will solidify from such a liquid, or semi-liquid state, and which will possess the required light-diffusing and other physical and optical properties when so solidified. An example of such a screen composition is methyl methacrylate, or any similar plastic containing grains of translucent matter to act as a diffusing medium. It should be empasized, however, that the choice of a screen composition depends on a number of factors, including the use to which the screen is to be put.

Into a mass of this liquid screen composition there is dispersed a relatively large number of thin, flat, opaque particles of magnetic material. These particles are chosen to have surface areas of small size relative to the thickness of the finished viewing screen, and may, for example, constitute ground-up iron foil. In any event, the particles are impervious to the passage of light therethrough, and they are so dispersed or scattered as to be of relatively uniform density throughout the mass of fluid or liquid screen composition.

This liquid mass containing the opaque particles is then caused to flow, or is otherwise formed, into a sheet having a thickness corresponding to the desired thickness of the finished viewing screen. This sheet is then subjected, while the screen composition is still in a fluid or liquid state, to the influence of a magnetic field acting at right angles to the surface of the sheet, as shown in Fig. 1. In this figure, the reference numeral 10 designates the sheet of liquid screen composition, 12 designates collectively the opaque particles dispersed in the screen composition 10, and 14 and 16 respectively designate the two poles of an electromagnet. The remaining structure of the electromagnet, as well as the means for energizing the same, has not been illustrated, as it may be of any type which will produce a magnetic field acting at right angles to the surface of the sheet 10, as indicated by the dotted lines 18.

Since the particles 12, in the form of the invention now being described, are composed of magnetic material, the magnetic field 18 acting at right angles to the surface of the sheet 10 will align the particles 12 so that the flat surfaces of these particles will lie in planes which are respectively perpendicular to the surface of sheet 10. This alignment of the particles 12 may be as indicated in Figs. 1 and 2, wherein Fig. 1 shows a cross-sectional view of the sheet 10, with the flat surfaces of the particles 12 lying respectively at right angles to the surface of the sheet, and wherein Fig. 2 shows a plan view of the sheet. The surfaces of the particles 12 are not aligned relative to each other by the action of the magnetic field, however, and the angles between the surface planes of adjacent particles may vary at random between zero and 180°, as shown in Figs. 1 and 2.

The ratio between the number of particles 12 and the thickness of sheet 10 has been greatly reduced in the drawing in order to provide a clear illustration of one form of the invention. Actually, the particles 12 are preferably smaller in size and more numerous per unit area of screen surface than has been shown, so that their spacing is in the order of an elemental area of the reproduced image. Expressed in another way, a straight line within the sheet 10 and drawn parallel to the surface thereof should intersect the particles 12 at intervals equal to the width of an elemental image area along the line.

When the particles have been aligned in the manner described above, the sheet of liquid screen composition is allowed to harden. It may be necessary in some cases to keep the sheet 10 under the influence of the magnetic field 18 during a portion of the solidifying process in order to maintain the alignment of the particles. This will depend to some degree on the nature of the screen composition, and also on the viscosity of the screen material at the time the alignment process is carried out. When hardening is complete, the sheet 10 may be cut to any desired dimensions.

Fig. 3 shows one means for aligning the particles 12 when they are composed of non-magnetic material, and hence not subject to the influence of the magnetic field 18 of Fig. 1. In Fig. 3 the electromagnet poles 14, 16 of Fig. 1 are replaced by two plates 20, 22 which are disposed as shown on opposite sides of the sheet 10, and which are respectively connected to the terminals of a battery or other source of energy 24 in such a manner as to form a condenser. The electrostatic field 26 thus produced between plates 20, 22 acts at right angles to the surface of screen 10, and aligns the non-magnetic particles 12 to approximately the same position that the magnetic particles are aligned by the electromagnetic field in Fig. 1.

It will now be appreciated that light which strikes one surface of screen 10 has a relatively unobstructed path through the screen material at right angles to the screen surface, but is greatly impeded in all other directions by the opaque nature of the particles 12. Hence, diffusion of light through the screen material from bright to dark image areas is appreciably reduced, and the contrast of the viewed optical image is improved.

Having thus described my invention, I claim:

A screen for viewing television images and the like, comprising a moldable sheet of translucent material having dispersed therein a plurality of thin, flat opaque particles arranged so that the flat surface of each particle is substantially perpendicular to the surface of the sheet, and further arranged so that the angles formed by the planes of the surfaces of adjacent particles vary between zero and 180°, whereby light which impinges the surface of the sheet is substantially prevented by the opaque nature of particles from being diffused in all directions except that substantially perpendicular to the surface of the sheet appreciably beyond the boundaries of the surface area actually impinged by the light.

GORDON L. FREDENDALL.

REFERENCES CITED

The following references are of record in the file of this patent:

UNITED STATES PATENTS

| Number | Name | Date |
| --- | --- | --- |
| 1,873,951 | Zocher | Aug. 30, 1932 |
| 1,918,848 | Land et al. | July 18, 1933 |
| 1,963,496 | Land | June 19, 1934 |
| 2,053,173 | Astima | Sept. 1, 1936 |
| 2,132,405 | Draeger | Oct. 11, 1938 |
| 2,287,556 | Land | June 23, 1942 |
| 2,290,581 | Donal | July 21, 1942 |
| 2,356,251 | Land | Aug. 22, 1944 |
| 2,390,162 | Meyer et al. | Dec. 4, 1945 |

FOREIGN PATENTS

| Number | Country | Date |
| --- | --- | --- |
| 285,738 | Great Britain | Feb. 15, 1928 |
| 419,295 | Great Britain | Nov. 5, 1934 |